(12) United States Patent
Strand et al.

(10) Patent No.: US 7,266,993 B2
(45) Date of Patent: Sep. 11, 2007

(54) CONTAINER LEAK DETECTION APPARATUS AND METHOD

(75) Inventors: Edward James Strand, New Berlin, WI (US); James Michael Dawley, Dousman, WI (US)

(73) Assignee: Air Logic Power Systems, Inc., Milwaukee, WI (US)

( * ) Notice: Subject to any disclaimer, the term of this patent is extended or adjusted under 35 U.S.C. 154(b) by 8 days.

(21) Appl. No.: 10/861,122

(22) Filed: Jun. 4, 2004

(65) Prior Publication Data

US 2005/0268700 A1    Dec. 8, 2005

(51) Int. Cl.
*G01M 3/32* (2006.01)

(52) U.S. Cl. .......................... 73/49.2; 73/45.2

(58) Field of Classification Search .............. 73/49.7, 73/41, 45.2, 41.3, 45.1, 45, 19.05, 863.71, 73/863.81, 864.73, 19.1, 49.2; 96/6; 198/341.03
See application file for complete search history.

(56) References Cited

U.S. PATENT DOCUMENTS

| | | | |
|---|---|---|---|
| 3,557,950 A * | 1/1971 | Powers | 209/526 |
| 3,683,677 A | 8/1972 | Harris | |
| 3,762,213 A * | 10/1973 | Nowicki | 73/45.3 |
| 3,805,593 A | 4/1974 | Sandoz et al. | |
| 3,813,923 A | 6/1974 | Pendleton | |
| 3,879,987 A * | 4/1975 | Yasuhiro et al. | 73/37 |
| 3,894,424 A * | 7/1975 | Taylor et al. | 73/49.2 |
| 3,987,664 A | 10/1976 | Hass et al. | |
| 4,019,370 A | 4/1977 | Allocco, Jr. | |
| 4,106,263 A | 8/1978 | Conrad | |
| 4,184,362 A | 1/1980 | Standley et al. | |
| 4,350,038 A | 9/1982 | Soncrant | |
| 4,459,843 A | 7/1984 | Durham | |
| 4,702,102 A * | 10/1987 | Hammerton | 73/19.1 |
| 4,708,014 A * | 11/1987 | Janitz | 73/37 |
| 4,785,666 A | 11/1988 | Bergquist | |
| 4,837,707 A * | 6/1989 | Giometti et al. | 702/51 |
| 4,864,848 A | 9/1989 | Irvine | |
| 4,899,573 A | 2/1990 | Dimmick et al. | |
| 5,121,627 A * | 6/1992 | D'Aoust | 73/19.05 |
| 5,125,499 A * | 6/1992 | Saathoff et al. | 198/468.01 |
| 5,239,859 A | 8/1993 | Lehmann | |
| 5,548,992 A | 8/1996 | Hallett et al. | |
| 5,571,949 A | 11/1996 | MacLaughlin | |

(Continued)

FOREIGN PATENT DOCUMENTS

EP        0311475 B1    4/1992

*Primary Examiner*—Hezron Williams
*Assistant Examiner*—Ryan Christensen
(74) *Attorney, Agent, or Firm*—Nicholas A. Kees; Godfrey & Kahn, S.C.

(57) ABSTRACT

An apparatus and method for testing a container as to leakage and defects. The apparatus is especially useful for testing plastic bottles because it does not contact one or more of the bottle sides during testing. A frame with the test components may be adjusted so that the apparatus will fit many different conveyor configurations and container sizes. A container is moved along by a conveyor, where it is sensed by a photo-eye to initiate testing. The test probe makes contact with the container opening, and travels with the container during testing. The test probe introduces air into the container and detects the maximum pressure and pressure decay. If the pressures are not within an acceptable range, the container is ejected from the conveyor.

17 Claims, 8 Drawing Sheets

U.S. PATENT DOCUMENTS

| | | |
|---|---|---|
| 5,591,899 A | 1/1997 | Griesbeck |
| 5,814,772 A * | 9/1998 | Nishimura et al. .......... 177/145 |
| 5,827,950 A | 10/1998 | Woodbury et al. |
| 5,907,093 A | 5/1999 | Lehmann |
| 5,918,270 A * | 6/1999 | Heuft .......................... 73/45.4 |
| 5,939,620 A * | 8/1999 | Strand ......................... 73/49.2 |
| 6,038,833 A * | 3/2000 | Beringer ...................... 53/253 |
| 6,082,184 A | 7/2000 | Lehmann |
| 6,105,477 A * | 8/2000 | Olson .......................... 83/167 |
| 6,279,382 B1 | 8/2001 | Yatagai |
| 6,360,871 B1 * | 3/2002 | Meyer et al. ............. 198/419.1 |
| 6,473,169 B1 | 10/2002 | Dawley et al. |
| 6,918,285 B2 * | 7/2005 | Chevalier et al. ............. 73/49.3 |
| 2002/0185358 A1 * | 12/2002 | Zeitler et al. ........... 198/370.02 |
| 2003/0221535 A1 * | 12/2003 | Kraus et al. ................... 83/686 |

* cited by examiner

CONTAINER LEAK DETECTION APPARATUS AND METHOD

BACKGROUND OF THE INVENTION

The present invention relates generally to a leak and defect testing device for containers, and more particularly to a continuously operating device that tests for leaks and defects in containers.

When containers are manufactured, especially blow-molded plastic containers, it is of great importance to be able to test the containers for leaks and defects before they are put into use. Such defects may include but are not limited to pin holes, malformed necks and neck obstructions that could inhibit filling.

A number of devices for testing container defects are known. As containers are conveyed along or through one of these prior devices, they may be "handled" using various methods, e.g. by using holding tools that maintain each container in a stationary position during testing, or by continuously stopping the conveyor so that each container may be tested. Freshly blow-molded containers may be hot and tacky. Contact with the container is in this state is undesirable as it can mar the fresh surface of the container and may cause containers to tip over and or jam the conveyor. Thus, time and product is wasted if even a single container becomes out of line.

Examples of prior art devices include U.S. Pat. No. 5,591,899 to Griesbeck. The patent discloses a device that in part, tests defects in containers using pressure and optoelectric means. Generally, a container is gripped at its necked surface and a sealing disk is pressed onto the container opening. A light or radiation source shines a radiation beam through the container to a receiver. The combination optic and pressure test will determine leakage and contamination defects. Greisbeck, however, requires that the containers be stabilized upon a carousel platform for testing which makes container handling more demanding and expensive. Further, the device cannot be easily used with an existing conveyor.

There is, thus, a demand for a simple and easily adjustable device for testing containers on an existing conveyor system, especially plastic bottles. It is especially desirable to be able to test such containers as to leakages and defects in one single step without contacting the container sides. It is also desirable to have a device that can maintain operation if a bottle tips over on the conveyor system.

SUMMARY OF THE INVENTION

The present invention relates to an apparatus for testing containers for defects such as leaks or other malformations that would reduce the usefulness of the container. As described in more detail below, and shown in the accompanying drawings, the apparatus of the present invention has an adjustable framework on which several test components are attached. Preferably the framework is portable and reconfigurable so that it may be used in conjunction with a variety of conveyor configurations and container sizes.

The test components of the apparatus include a test probe that is lowered onto a container opening so that testing can occur as the container and test probe move down the conveyor. This test probe inputs air into the container and measures the resulting pressure and pressure decay over time. The test is short enough that it can take place within the several inches the probe assembly travels on the conveyor. Certain sensors, such as a photo-eye that detects when a container is present and an encoder that detects conveyor speed, enable the apparatus to test containers that are spaced apart at random intervals on the conveyor.

Containers that cannot achieve or maintain a predetermined test pressure are ejected from the conveyor. Because the probe assembly does not contact the container sides, the acceptable containers proceed into production unmarred by the test procedure.

Various other features, objects, and advantages of the invention will be made apparent to those skilled in the art from the following detailed description including illustrative examples setting forth how to make and use the invention.

DESCRIPTION OF THE PREFERRED EMBODIMENT

Figure 1:
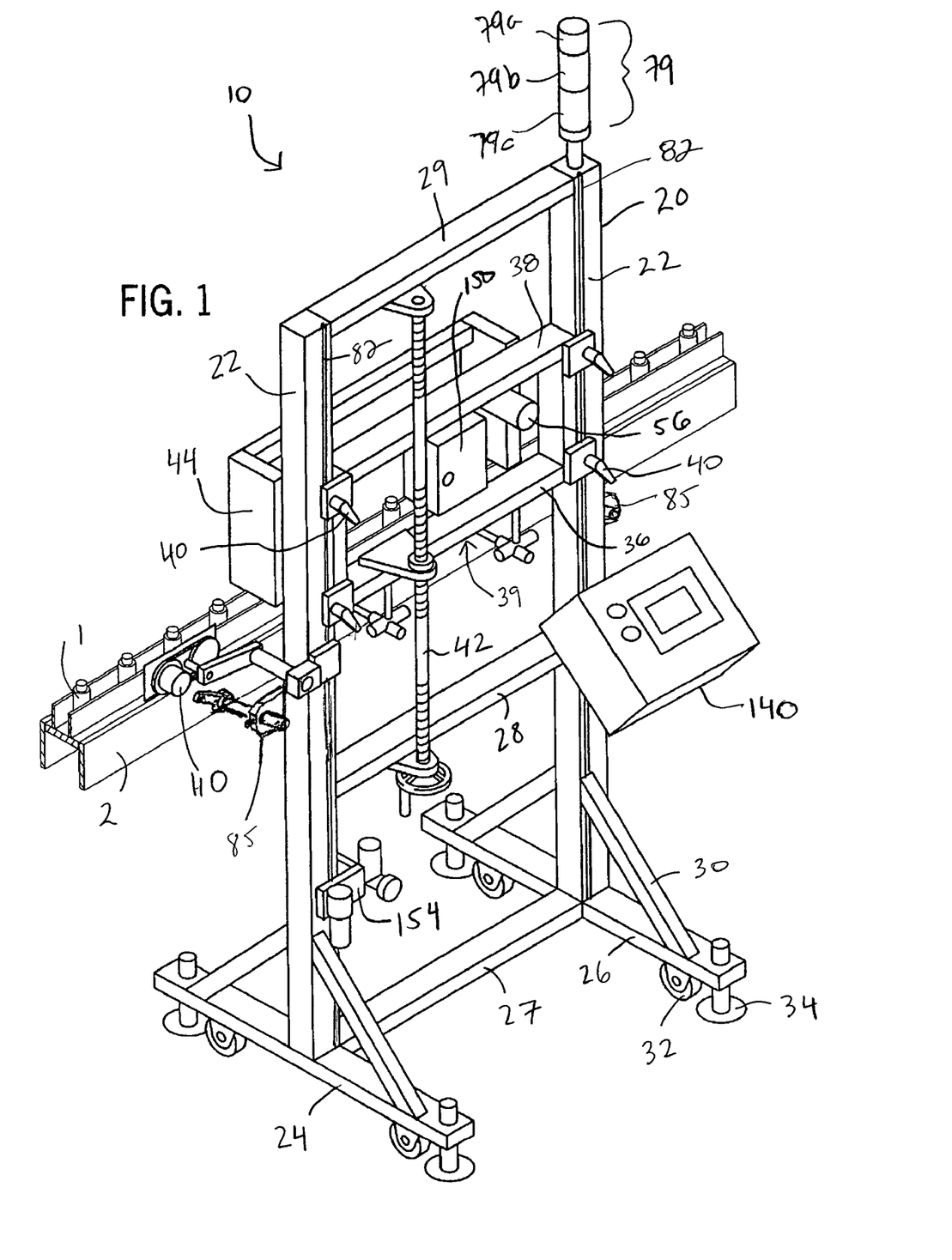
FIG. 1 is a front perspective view of the container testing apparatus of the present invention.

In reference to FIG. 1, the apparatus 10 of the present invention is utilized for testing a recently molded plastic bottle 1. It is possible to test containers or "closed volumes" of different sizes and shapes. It is also possible to test containers made from different kinds of materials, i.e. the invention is not limited to testing plastic containers.

The apparatus 10 of the present invention is portable, and can be adapted to fit various conveyors 2. In the figures of the present description, only a portion of a conveyor 2 is shown. The full conveyor 2 may have various configurations, which configurations can be accommodated by the adjustable frame 20 on which are mounted various components of the apparatus.

Figure 4:
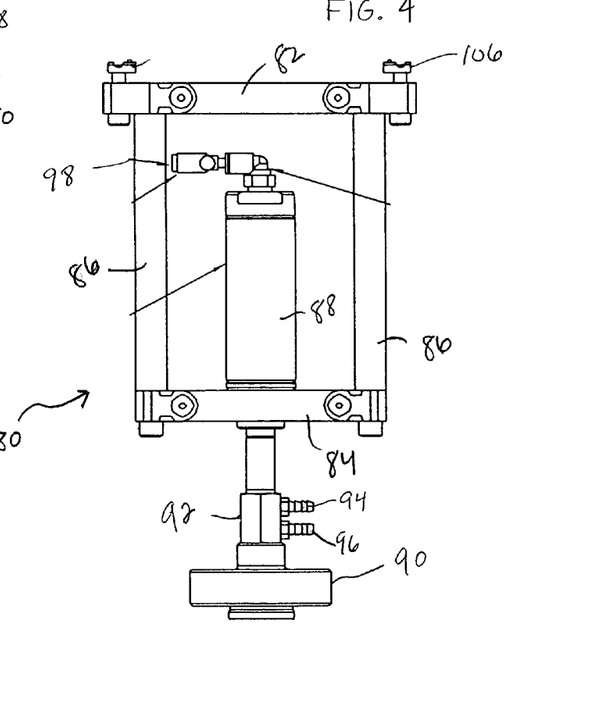
FIG. 4 is a partial front view of a probe assembly that is attached to the frame portion in FIG. 3.

The apparatus 10 components include a probe assembly 80 that further includes a test head assembly 90 (see FIG. 4). In general, the probe assembly 80 moves reciprocatingly from a predetermined starting point to synchronize sequentially with each container 1 as it passes by, and then returns to the starting point. Once probe assembly 80 is aligned with a container 1, the test head assembly 90 is moved downward to seal onto the top of the container 1, and the container is pressurized. Sensors sense the pressure held by the container 1, as well as the speed and position of the container. A control system 140 then determines whether to reject the container 1, or permit the container to continue on the conveyor and be put into use. Each of these components will be described in more detail presently.

Frame

The apparatus 10 includes a frame 20 of any suitable configuration and material. Most preferably, frame 20 has a ladder-like construction as shown in FIG. 1. In the embodiment shown, the frame 20 includes vertical posts 22, preferably two of them of about the same height, spaced apart by several fixed, horizontal, equal-length supports, specifically a lower support 27, mid-support 28 and top support 29. Frame 20 is preferably constructed from a channel-style tubing as shown in detail in FIGS. 2 and 3, but may be made with other types of stock tubing or other suitable material.

The apparatus 10 also includes a component frame 39 to support the various components as described herein. Component frame 39 includes a pair of horizontal rails 36, 38, located between top support 29 and mid-support 28. Component frame 39 is vertically adjustable so that the components attached thereto can be properly positioned with respect to many different conveyors, regardless of the conveyor configurations. Most preferably, rails 36 and 38 of frame 39 are connected with vertical risers 41 (see FIG. 2) so that they remain separated by a fixed distance.

Figures 2, 2A:
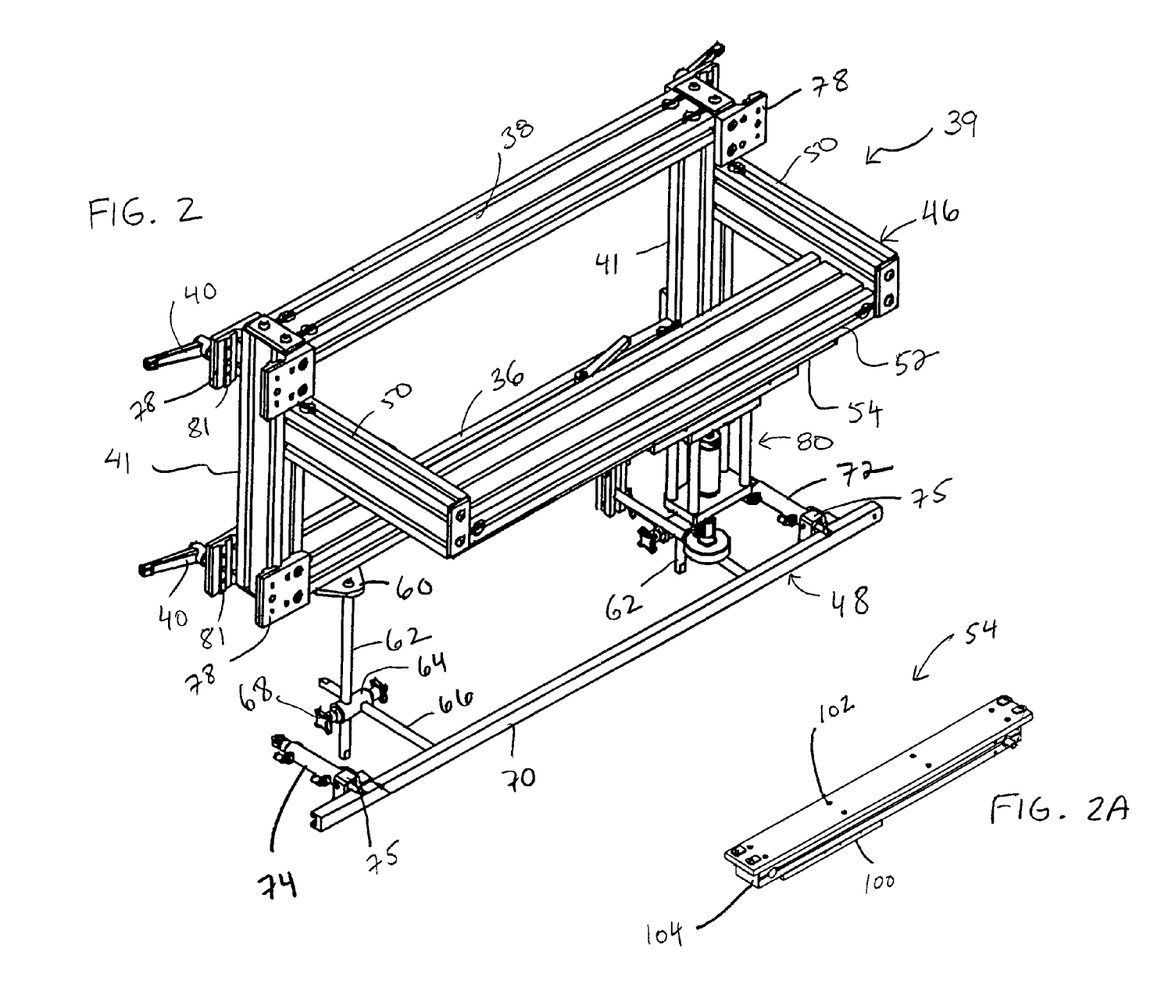
FIG. 2 is a partial rear perspective view of the component frame of the apparatus of FIG. 1.
FIG. 2A is a partial top perspective view a linear slide, of which only a portion is visible in FIG. 2.
Figure 3:
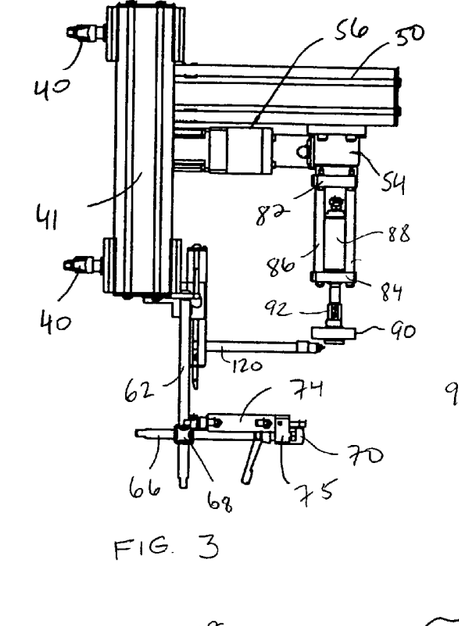
FIG. 3 is a side elevational view of the frame portion shown in FIG. 2.

Referring to FIG. 2, component frame 39 further includes a pair of brackets that extend toward the rear of apparatus 10, namely an upper box bracket 46 and a lower channel bracket 48. Box bracket 46 has a pair of side arms 50 extending outwardly from risers 41 to support a rail 52. Rail 52 supports a linear slide assembly 54 as seen in FIGS. 2A and 3. Referring to FIG. 3, the linear slide assembly 54 is driven by a servo-motor 56.

Referring once again to FIG. 2, the lower channel bracket 48 is attached to each end of rail 36 by a small bracket 60. Bracket 48 is adjustable in both the vertical and horizontal planes. To achieve such adjustability, bracket 48 includes a pair of vertical rods 62 fixed near each end of rail 36. A horizontal rod 66 is adjustably attached to each vertical rod 62 so that it is about parallel with arms 50. Preferably, a sliding connector 64, constructed from an elongated member having two apertures therein, spaced apart along the length thereof, is used to connect rod 62 to rod 66. Connector 64 is capable of being locked with respect to one or both rods 62, 66. For example, locking screws 68 may be threaded into each end of the connector 64 so that they contact the rods 62, 66 when locking is desired. Attached to the outward end of each rod 66 is a channel member 70. Member 70 supports components such as the reject cylinder 72 and pinch cylinder 74, described below. Member 70 does not necessarily need to be made from a channel shaped piece; other profiles are acceptable as long as components can be selectively placed along the length of member 70 for proper positioning with respect to the probe assembly 80, described herein. Most preferably, however, the reject cylinder 72 and pinch cylinder 74 are attached to member 70 with a selectively lockable bracket 75 that slides in the channel portion of member 70.

Referring to FIGS. 1 and 2, a vertical height adjuster 42, such as a screw jack, is attached to frame 20 at supports 28, 29, and either rail 36 or rail 38 so that frame 39 can be vertically adjusted. It is realized that various other mechanisms may be used instead of a screw jack, including but not limited to automated mechanisms, manual adjustment by hand, other types of gearing, such as a worm gear.

Referring to FIG. 2, at least one bracket 78, and preferably a pair of brackets 78, are attached to each side of frame 39 so that it has a sliding connection to each post 22 of frame 20 as shown in FIG. 1. Most preferably, each bracket 78 has a pair of tongues 81 that correspond to a groove 82. Grooves 82 are located on the sides contacted by brackets 78 and may extend the length of post 22. Any other method of adjustably attaching frame 39 to posts 22 is acceptable. Preferably, once frame 39 is adjusted to a desired level, the rails 36, 38 are locked to frame 20. To achieve locking, convenient locking handles 40 may be placed on each bracket 78 as seen in FIGS. 1 and 2.

Frame 20 is primarily supported by a pair of horizontal legs 24, 26 which are preferably in parallel relation to one another. So that apparatus 10 is easy to move from one place to another, legs 24, 26 are preferably on wheels 32. To provide leveling and to prevent rolling, feet 34 may be placed adjacent wheels 32. Additional braces 30, connected to the posts 22 and legs 24, 26, may be used for additional stability.

Still referring to FIG. 1, preferably, a guard 44 constructed from clear panels surrounds the portion of frame 39 that extends from posts 20 and all the components attached to frame 39. This is for safety, and does not affect operation of apparatus 10.

In the preferred embodiment, somewhere on frame 20, preferably at the top of post 22, there is a set of status lights 79 that indicates if the machine is sensing a malfunction, is in setup mode or in operation. The three lights may be arranged on a pole as seen in FIG. 1, and be colored red, yellow and green to indicate the respective status. An audio alarm may accompany the status lights 79, for instance, if a malfunction occurs.

Preferably, a pair of fasteners 85 may be used to selectively attach the frame 20 to a conveyor, see FIG. 1. Of course, many other frame configurations are possible, including those that are in permanent position with respect to a conveyor 2. The frame 20 described above is only one example.

Probe

Figure 5:
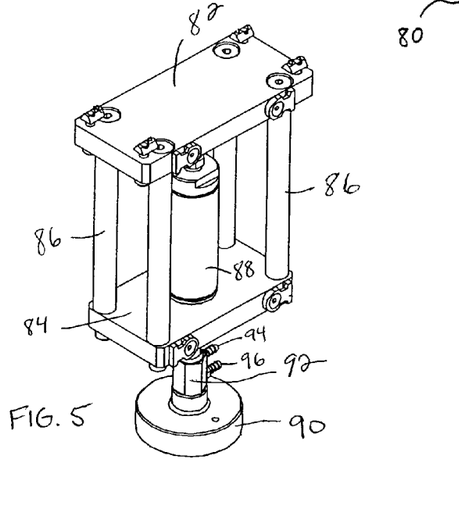
FIG. 5 is a top perspective view of the probe assembly of FIG. 4.

Referring to FIGS. 3-5, the probe assembly 80 makes contact with each upright container (not shown) that passes by via the conveyor 2 shown in FIG. 1. The probe assembly 80 includes a mounting plate 82, and a base plate 84 separated therefrom by a set of spacers 86. There are preferably four spacers 86, each located in a respective corner of the plates 82, 84. A pneumatic cylinder 88 is seated in an aperture that extends through the base plate 84, preferably at the center. A test head assembly 90 is attached to the lower end of cylinder 88 with an adapter 92. Adapter 92 has a pair of nipples to which air line tubes (not shown) are attached, namely a fill nipple 94 and a sensor nipple 96. A fitting 98 is connected to the top of cylinder 88 to receive air for operating the cylinder.

The probe assembly 80 is attached to component frame 39 by the linear slide assembly 54, which is best seen in FIGS. 2A and 3. The linear slide assembly is an elongated plate 102 with a belt assembly 104 attached thereto. The servo-motor 56 drives the belt assembly 104. The probe assembly 80 attaches to a plate 100 that is in turn attached to the belt assembly 104, see FIG. 2A. Thus, when the belt assembly 104 is activated, the probe assembly 80 moves linearly along slide assembly 54. Preferably, plate 82 is attached to plate 102 with fasteners 106 (see FIG. 4).

Figure 6:
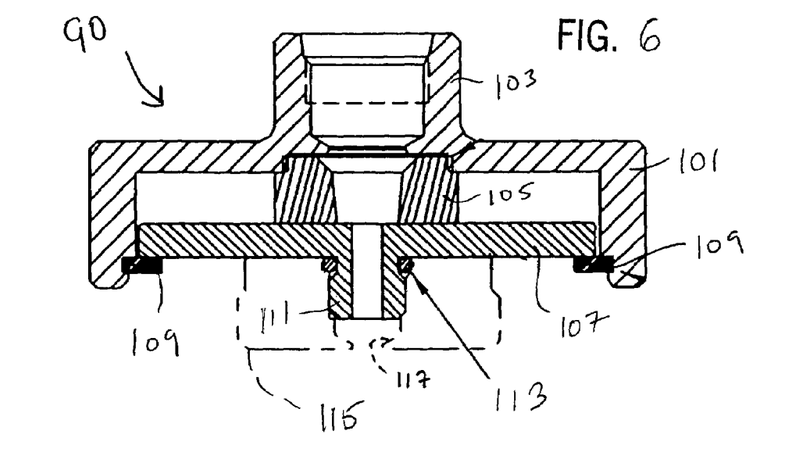
FIG. 6 is a partial sectional view of the test head of the probe assembly shown in FIG. 5.

The test head assembly 90 is depicted in detail in FIG. 6. Test head assembly 90 is designed so that it can be easily adapted to test a wide variety of containers, ranging from very small bottles to large coffee canisters, five-gallon water bottles, etc. To this end, test head assembly 90 includes a probe housing 101, which is preferably circular in top view, as can be seen in FIG. 5, because most containers have circular openings. Overall, probe housing 101 is generally cylindrical in shape with one open end. The opposite end of housing 101 has necked portion 103 with a specially profiled aperture extending therethrough. The inner profile of the necked portion 103 is governed by air cylinder to which it will be fitted, as will be described presently. The test head assembly further includes a spacer 105 that is seated against an inner surface of housing 101. Spacer 105 has an aperture extending through the length thereof, which preferably converges in the direction away from the necked portion 103. Held against the spacer 105, preferably within the interior of the housing 101, is a sealing disk 107. The sealing disk 107 is held there by a retaining ring 109, which fits within a channel formed for that purpose in the inner surface of the housing 101. The sealing disk 107 has a nipple 111 located centrally with respect to the sealing disk and extending away from the housing 101. Nipple 111 has an aperture extending therethrough. Thus, air introduced into the necked portion 103 can flow through the spacer 105 and sealing disk 107. Preferably, the diameter of nipple 111 is reduced in the portion next to the outer surface of sealing disk 107 for the purpose of accommodating an o-ring 113. Next, an interchangeable contact member 115 is fitted over nipple 111 and pushed firmly against sealing disk 107 and optional o-ring 113. Contact member 115 is annular in shape and has an aperture 117 that coincides with the aperture of sealing disk 107. Preferably, aperture 117 has an outer opening diameter similar to the aperture in disk 107, and an inner diameter that is substantially larger to ensure contact with smaller container openings while at the same time ensuring that air flow is not blocked by a misaligned member 115.

Figure 7:
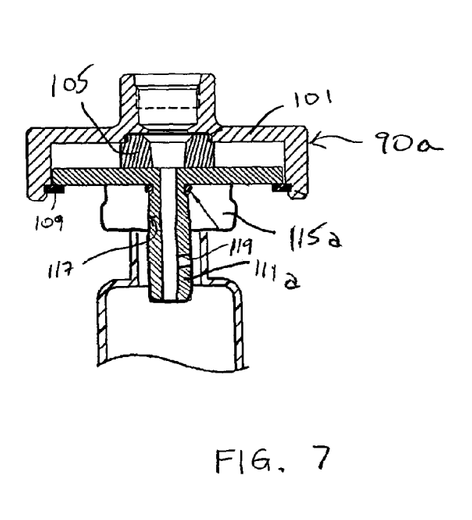
FIG. 7 is a partial sectional view on another embodiment of the test head shown in FIG. 6, with an elongated portion that detects malformation of the container opening.

Another embodiment of the test head assembly is shown in FIG. 7. This test head assembly 90a differs in only two respects from the test head assembly 90 shown and described above. First, the nipple 111a is substantially longer, the purpose of which is to manually probe for malformations in the container opening. A second side aperture 119 may be placed in nipple 111a for the purpose of venting air displaced by insertion of nipple 111a into container 1 prior to sealing to prevent uncontrolled pressurization of the container. The side aperture 119 is also used to vent air from inside of the container should the tip of nipple 111a seal on deformities located inside the container neck. Second, the contact member 115a has an aperture that conforms to the outer surface of the nipple 11a.

Sensors

Figure 8:
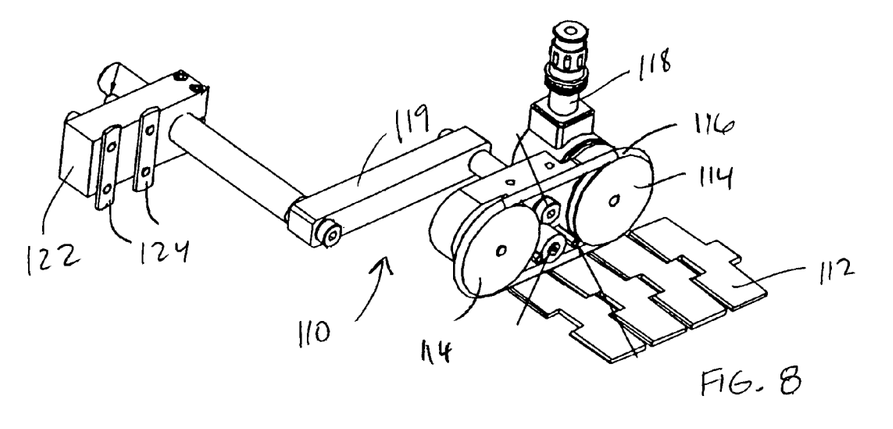
FIG. 8 is a partial rear perspective view of the encoder as shown in FIG. 1, the encoder making contact with the conveyor.

Referring now to FIGS. 1 and 8, an encoder 110 tracks the speed and position of the conveyor 2. Preferably, the encoder 110 is specifically designed to account for misaligned or broken conveyor links in the conveyor belt 112. The encoder 110 is adjustably connected to frame 20 so that it may contact the conveyor belt 112 on which the containers are transported. In a preferred embodiment, a pair of grooved pulleys 114 is surrounded by a single belt or o-ring 116. O-ring 116 is adjusted to make contact with the conveyor belt 112 so that as the conveyor 2 moves, pulleys 114 rotate. A transducer 118 sends electrical input to a control system 140, described in more detail below. Encoder 110 is attached to frame 20 by means of an adjustable arm 119, at one end of the arm. To the opposite end of arm 119 is attached a mounting member 122, which includes a pair of slats 124 that slide into grooves on frame 20. This allows for easy linear vertical adjustment of encoder 110 during setup. The encoder 110 of FIG. 8 is shown by way of example. Other means such as optical sensors may be used for the same purpose.

Figure 9:
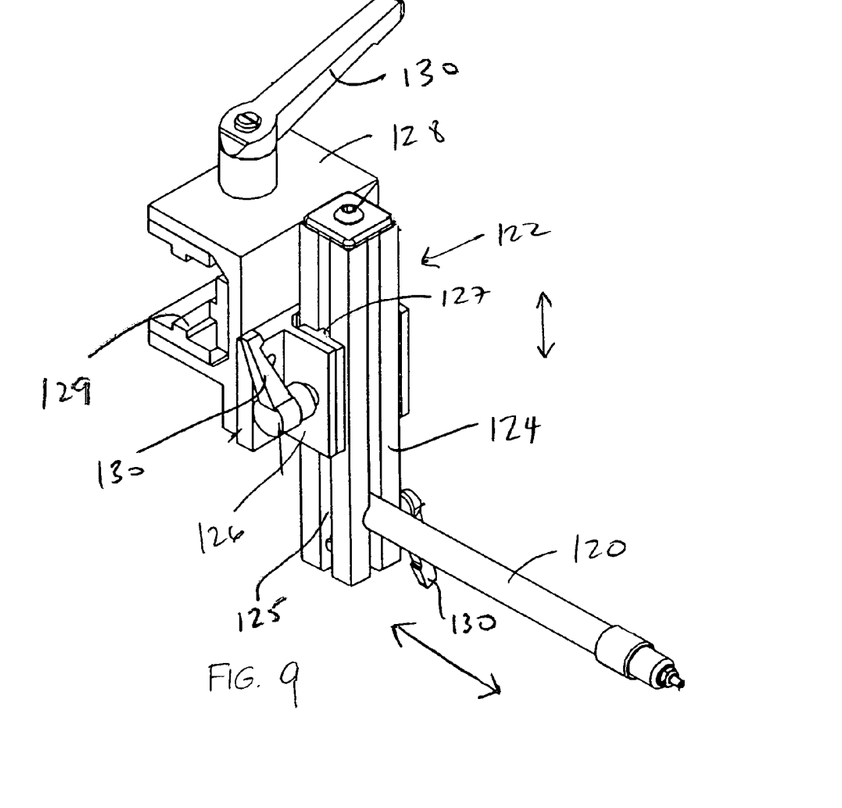
FIG. 9 is a partial rear perspective view of the photo-eye as shown in FIG. 1.

Referring to FIGS. 1, 2 and 9, a photo-eye 120 is positioned on component frame 39 at rail 36. A preferred photo-eye 120 includes optical fibers and is manufactured by either Sunx Ltd. or Keyence Corporation of America.

Figure 12:
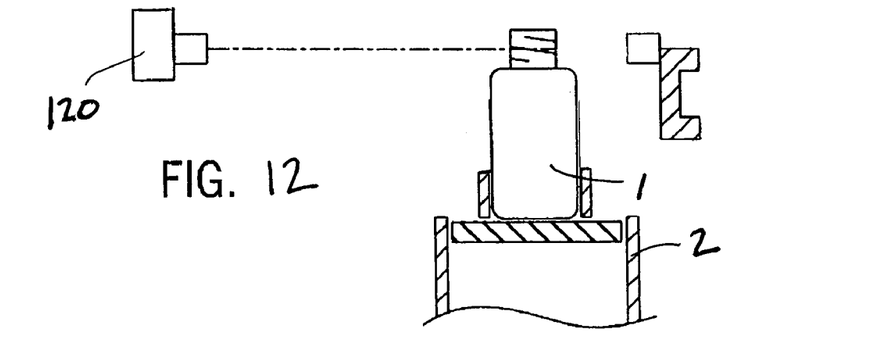
FIG. 12 is a side partial schematic view of the photo eye component of the present invention shown in FIG. 1, wherein a container is detected by a beam of light extending from the photo eye.

Photo-eye 120 senses when a bottle 1 (FIG. 12) is in position to start a test cycle. Thus, the photo-eye 120 is positioned up-stream with respect to the direction of motion of the conveyor 2. The sensing-end of photo-eye 120 is placed adjacent to the line of conveyed containers. The opposite non-sensing end is connected to a remote controller located on the lower surface of enclosure 150 (see, FIG. 1).

Referring to FIG. 9, the photo-eye 120 is attached to a holder 122 so that it may be adjusted vertically and horizontally, allowing photo-eye 120 to be placed near to an upper portion of a container 1 where the test head assembly 90 will make adequate contact for the test to occur. Preferably, photo-eye 120 is attached perpendicularly to a vertical member 124 that has slots 125 on the sides thereof. A locking bracket 126 has fingers 127 that slidingly engage slots 125. Bracket 126 is connected to a second locking bracket 128 that slidingly engages rail 36 (FIG. 2). Bracket 128 has fingers 129 that fit into corresponding slots or grooves on rail 36. Thus, bracket 126 allows vertical adjustment and bracket 128 horizontal adjustment of photo-eye 120. Locking of the photo-eye position may be achieved by locking handles 130, positioned to lock into place the photo-eye 120 and brackets 126, 128. Of course, this is only one way that the positioning of the photo-eye may be achieved.

Action Cylinders

There are two system components other than the probe assembly 80 that may make contact with the containers as they are conveyed, namely, the reject cylinder 72 and the pinch cylinder 74. Referring to FIG. 2, reject cylinder 72 is placed downstream of the probe assembly 80 and serves to eject a defective container 1 from the conveyor 2 by pushing the container off the side of the conveyor. Pinch cylinder 74 is positioned upstream from the probe assembly 80. When extended, pinch cylinder 74 serves to hold back containers 1 on the moving conveyor 2 so that they are prevented from reaching probe assembly 80 (see FIG. 11). This holding back is useful mainly during setup, or if a test malfunction occurs (e.g. component failure), as explained herein.

Cylinders 72 and 74 are preferably pneumatic cylinders that are slidingly attached to member 70, and may be selectively locked in position. Cylinders 72, 74 are pneumatically connected to the control system as described herein. The position of cylinders 72 and 74 are interchangeable to accommodate a reversal in conveyor direction. An air regulator/air filter assembly 154 (see FIG. 1) is used to regulate and filter incoming air prior to the pressurized air being supplied to the cylinders 72, 74.

Controls and Pneumatics

Referring to FIG. 1, the apparatus 10 is controlled electronically, by control system 140, advantageously located at the front of the apparatus for easy access by an operator. One suitable control system 140 is an electronic circuit designed for a previous test apparatus, namely the "STM2 Test Circuit" sold by Air Logic Power Systems, Milwaukee, Wis. The control system 140 controls apparatus 10 with sufficient flexibility so that the apparatus can accommodate many different types of conveyor 2 and container 1. The variables that are inputted into the control system 140 include: container diameter or length, container opening size, container volume, and conveyor direction. These variables may be entered when prompted by an operator interface provided by the control system 140. In the embodiment shown, the control system 140 controls a pneumatic controller 150.

Figure 10:
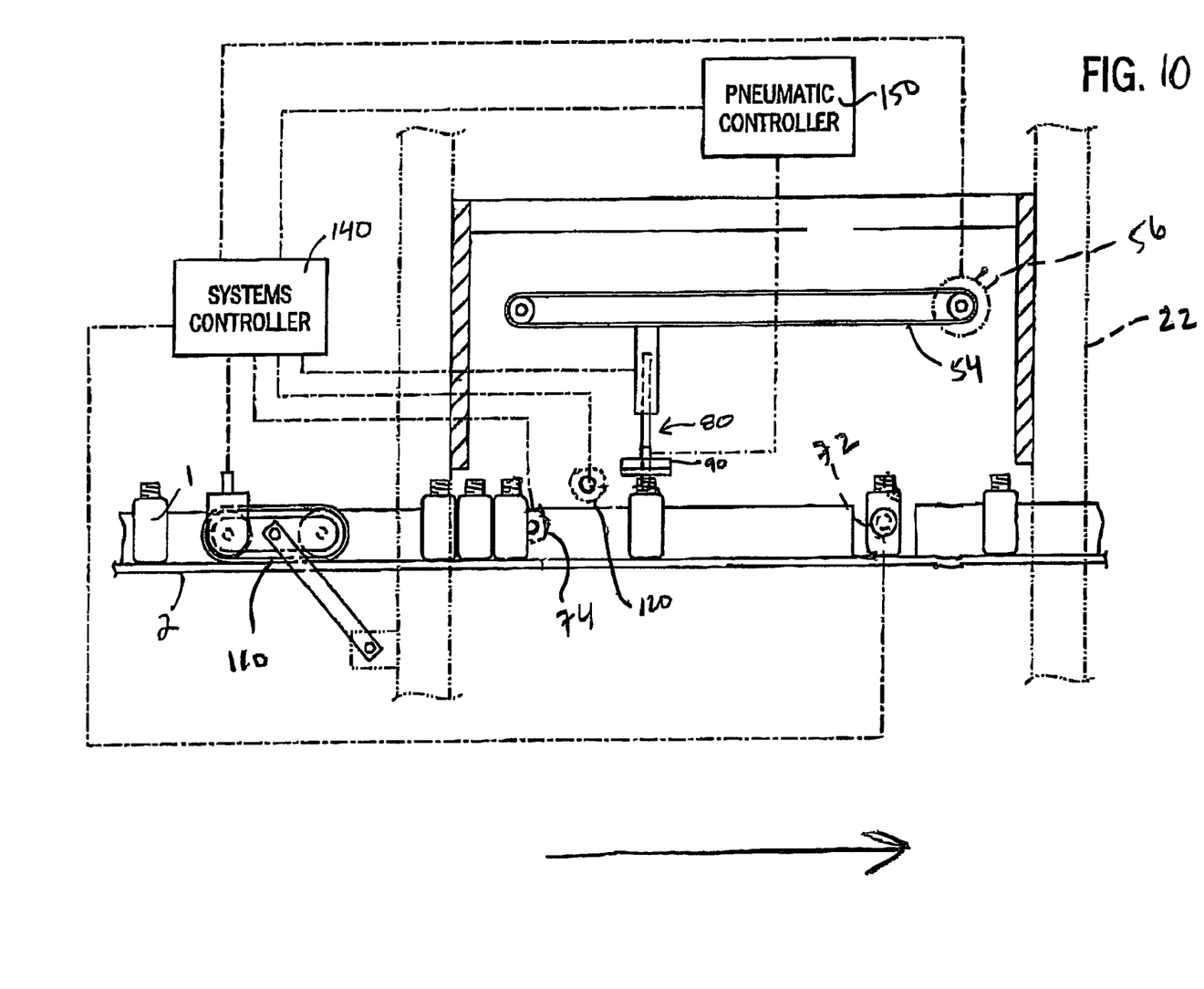
FIG. 10 is front partial schematic diagram showing the way the testing apparatus of FIG. 1 interacts with a conveyor line of containers, with the frame shown in phantom.

Shown schematically in FIG. 10 is the relationship between the pneumatic controller 150 and the control system 140. The pneumatic controller 150 causes air to be introduced into the container 1 through the test head assembly 90. The control system 140 senses and analyzes the change in pressure within the container 1 over time, and controls the servo-motor 56. By its control over the pneumatic controller 150, the control system 140 also controls pinch cylinder 74, reject cylinder 72 and probe assembly 80.

Operation

In operation, the frame 20 and other components of apparatus 10 are positioned so that (i) the encoder 110 engages the conveyor 2, (ii) the photo-eye 120 is positioned near the level of the opening in the containers 1 (preferably at a necked portion if applicable), (iii) the pinch cylinder 74 is positioned upstream of the probe assembly 80, and (iv) the reject cylinder 72 is positioned downstream of the probe assembly. The probe assembly 80 is positioned on the linear slide assembly 54 so that the stroke or distance the probe travels during testing is within the length of the linear slide. The test head assembly 90 is fitted with a properly-sized contact disk 115; the size of the diameter of the contact disk is selected so that it covers the container opening and allows for some horizontal misalignment of the container opening with respect to the axis of probe assembly 80.

Figure 11:
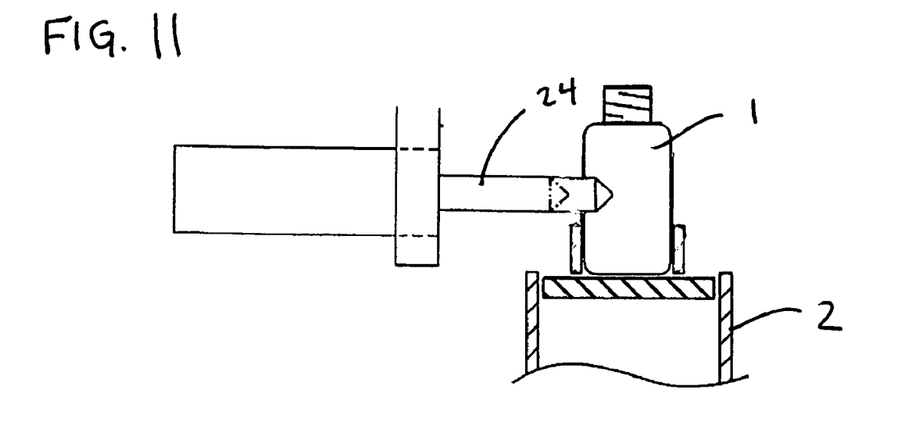
FIG. 11 is a side partial schematic view of the pinch cylinder component of the present invention shown in FIG. 1.

After apparatus 10 is properly positioned with respect the conveyor 2 and container, certain information is inputted into the control system 140. Preferably, an operator accesses the control system 140 and inputs information, including but not limited to the following: container diameter or length, container opening size, container volume, and conveyor direction. During set-up, the containers may be held in a stationary position on the conveyor 2 by the pinch cylinder 74, as seen in FIG. 11.

Figure 6A:
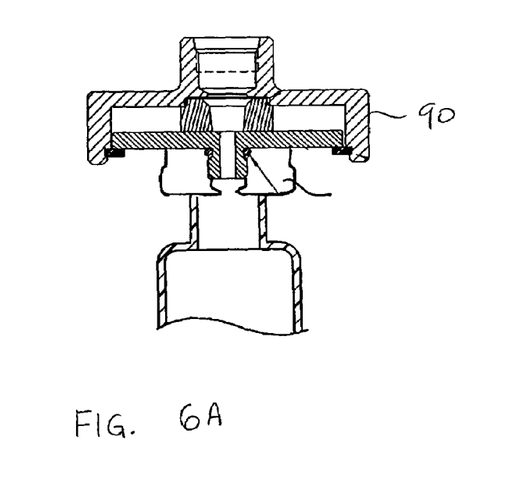
FIG. 6A is a partial sectional view of the test head shown in FIG. 6, in test position with respect to a container.
Figure 13:
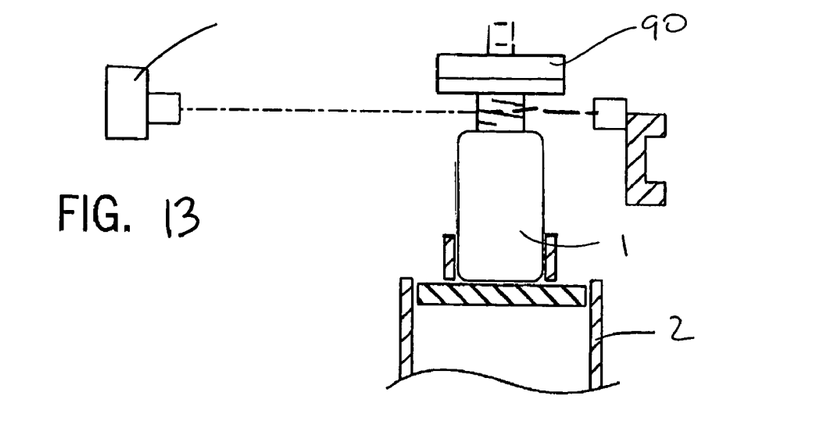
FIG. 13 is a side partial schematic view of the photo eye and the probe assembly component of the present invention shown in FIG. 12, wherein the container has crossed the beam of light extending from the photo eye and activated the probe assembly.
Figure 14:
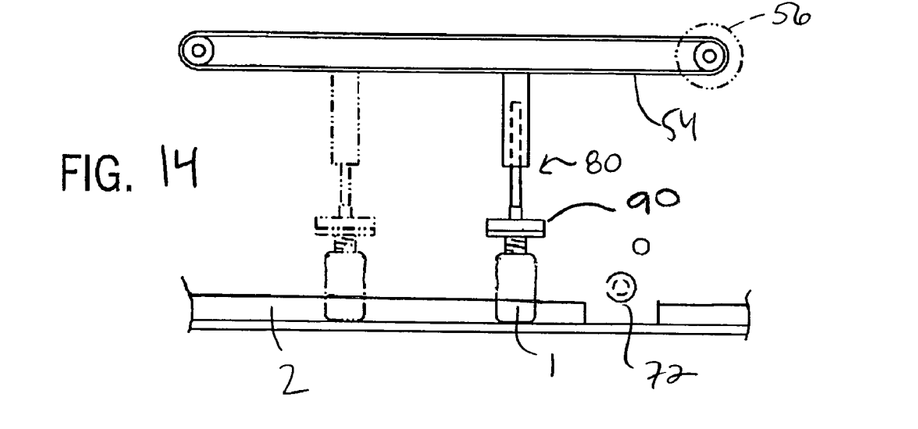
FIG. 14 is a rear partial schematic view of a container being tested by the apparatus of FIG. 1.

After inputting the set-up information, the containers 1 are brought to the test head assembly 90 via the conveyor 2, see in general, schematic FIG. 10. The existence of each container is sensed by the photo-eye 120 as it passes the photo-eye, see schematic FIG. 12. Therefore, the containers 1 can either be randomly spaced or touching on the conveyor as shown in FIG. 10. When the photo-eye 120 senses a container, the linear slide assembly 54 is driven by the servo-motor 56 so that probe assembly 80 with test head assembly 90 is moved into test position as the container 1 travels along the conveyor 2, see also FIGS. 6A, 7 and 13. Thus, the servo-motor 56 accelerates to match the conveyor speed. When speed is matched, the probe test head assembly 90 is lowered so that it makes contact with and seals the container opening. The test is initiated by introducing air into the container 1 to a predetermined pressure, and sensing the pressure change over time. The test head assembly 90 travels with the container 1 during the test as seen in schematic FIG. 14. At the end of the test, the servo-motor 56 returns the probe assembly 80 back to a start position so that it may start tracking and then testing another container 1, even before the previously tested container is accepted or rejected, based on the test results.

Figure 15:
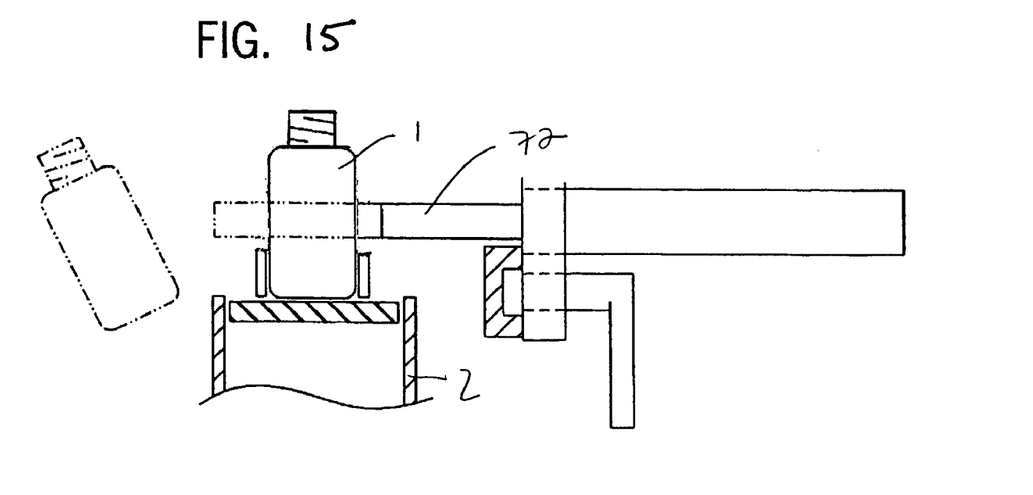
FIG. 15 is a side partial schematic view of a container being ejected from the conveyor by the reject cylinder of the present invention.

The test results are computed by the control system 140 according to parameters that have been set up for the particular container 1 and conveyor 2. Containers that do not change in pressure too rapidly and that achieve desired minimum pressure are allowed to pass beyond the apparatus 10 and continue on the conveyor 2 into production. As seen in schematic FIG. 15, containers that permit a drop in pressure too rapidly, or do not achieve a desired minimum pressure, are ejected from conveyor 2 by the reject cylinder 72 located just downstream of the probe assembly 80.

While the invention has been described with reference to preferred embodiments, those skilled in the art will appreciate that certain substitutions, alterations, and omissions may be made without departing from the spirit of the invention. For example, the pinch cylinder or reject cylinder may be positioned differently with respect to the container. Accordingly, the foregoing description is meant to be exemplary only and should not limit the scope of the invention set forth in the following claims.

What is claimed is:

1. A portable apparatus for the pneumatic testing of blow-molded containers having a top opening, the containers being continuously transported on a conveyor, the apparatus comprising:
   an encoder for monitoring the speed of the conveyor;
   a sensor for sensing each of the containers in or near a position to be tested;
   a probe assembly that sealingly applies pneumatic pressure to each container;
   a slide for positioning the probe assembly where it can perform the pneumatic testing on each passing container and moving the probe assembly from a starting point along the conveyor to synchronize the probe assembly sequentially with each container during testing and thereafter returning the probe assembly to the starting point; and
   wherein the encoder, the sensor, the probe assembly, and the slide are controlled by a control system; and
   wherein the only contact between the apparatus and the containers is with a top surface of each of the containers during testing.

2. The apparatus of claim 1 further comprising a motor controlled by the control system, the control system receiving input from the encoder so the motor can drive the slide and the probe assembly at a speed that allows each passing container to be pneumatically tested.

3. The apparatus of claim 1 further including a reject cylinder for ejecting defective containers from the conveyor, the reject cylinder positioned downstream from the probe assembly.

4. The apparatus of claim 1 further including a pinch cylinder for preventing conveyed containers from advancing to the probe assembly.

5. The apparatus of claim 1 wherein the sensor comprises a photo-eye.

6. The apparatus of claim 2 wherein the motor comprises a servo-motor.

7. The apparatus of claim 6 wherein the slide comprises a linear-slide that can translate the probe assembly to a position where it can perform the pneumatic testing on each passing container.

8. The apparatus of claim 4 wherein the probe assembly can test containers moving on a conveyor in a forward or reverse direction.

9. The apparatus of claim 1 further comprising a frame on which the probe assembly and slide are mounted, and wherein the frame may be adjusted to accommodate various conveyor and container configurations.

10. The apparatus of claim 9 wherein the frame is not connected to the conveyor.

11. The apparatus of claim 1 wherein the probe assembly comprises:
 a piston that moves in a direction substantially parallel to a vertical axis of the container; and
 a test head with a substantially flat contact surface for sealing the container opening.

12. The apparatus of claim 11 wherein the flat contact surface comprises an elastomeric material so that it conforms to any minor imperfections on the container opening.

13. A portable apparatus for the pneumatic testing of blow-molded containers having a top opening, the containers being continuously transported on a conveyor, the apparatus comprising:
 an encoder for monitoring the speed of the conveyor;
 a sensor for sensing each of the containers in or near a position to be tested;
 a probe assembly that sealingly applies pneumatic pressure to each container;
 a slide for positioning the probe assembly where it can perform the pneumatic testing on each passing container; and
 wherein the encoder, the sensor, the probe assembly, and the slide are controlled by a control system;
 wherein the only contact between the apparatus and the containers is with a top surface of each of the containers during testing;
 wherein the probe assembly comprises:
  a piston that moves in a direction substantially parallel to a vertical axis of the container; and
  a test head with a substantially flat contact surface for sealing the container opening; and
 wherein the test head can be selectively removed and replaced to accommodate a container opening of a different configuration.

14. The apparatus of claim 11 further including an interference probe that protrudes from the flat contact surface, wherein when the test head contacts the container opening, the interference probe is inserted into the container to detect structural anomalies therein.

15. A method of using an apparatus used for testing blow-molded containers conveyed on a conveyor for defects, the method comprising the following steps:
 providing an apparatus for testing the containers, the apparatus comprising:
 an encoder for monitoring the speed of the conveyor;
 a sensor for indicating each of the containers is in a position to be tested;
 a probe assembly that applies pneumatic pressure to each container;
 a slide for moving the probe assembly to a position where it can perform the pneumatic testing on each passing container; and
 a motor that receives input from the encoder so the motor can drive the linear-slide and probe assembly at a speed that allows each passing container to be pneumatically tested;
 activating the encoder to sense the speed of the conveyor;
 aligning the sensor so that it can sense when a bottle is presented for testing;
 aligning the probe assembly so that it can apply pneumatic pressure to the container; and
 synchronizing the motor's movement of the probe assembly from a starting point along the conveyor sequentially with each container during testing and thereafter returning the probe assembly to the starting point.

16. The method of claim 15 further comprising positioning the apparatus for testing defects adjacent a conveyor that conveys containers.

17. The method of claim 16 further including the steps of:
 conveying containers past the apparatus so that the probe assembly can apply pneumatic pressure to each container; and
 ejecting any bottles from the conveyor that do not match pre-determined criteria based on the behavior of the pneumatic pressure over a select time period.
 wherein the only contact between the apparatus and the containers is with a top surface of each of the containers during testing.

\* \* \* \* \*

UNITED STATES PATENT AND TRADEMARK OFFICE
CERTIFICATE OF CORRECTION

| | |
|---|---|
| PATENT NO. | : 7,266,993 B2 |
| APPLICATION NO. | : 10/861122 |
| DATED | : September 11, 2007 |
| INVENTOR(S) | : Strand et al. |

Page 1 of 1

It is certified that error appears in the above-identified patent and that said Letters Patent is hereby corrected as shown below:

Column 10
Line 47, the paragraph "wherein the only contact between the apparatus and the containers is with a top surface of each of the containers during testing." should be deleted from the patent Signed and Sealed this Eighth Day of April, 2008

JON W. DUDAS
*Director of the United States Patent and Trademark Office*